Patented Mar. 18, 1924.

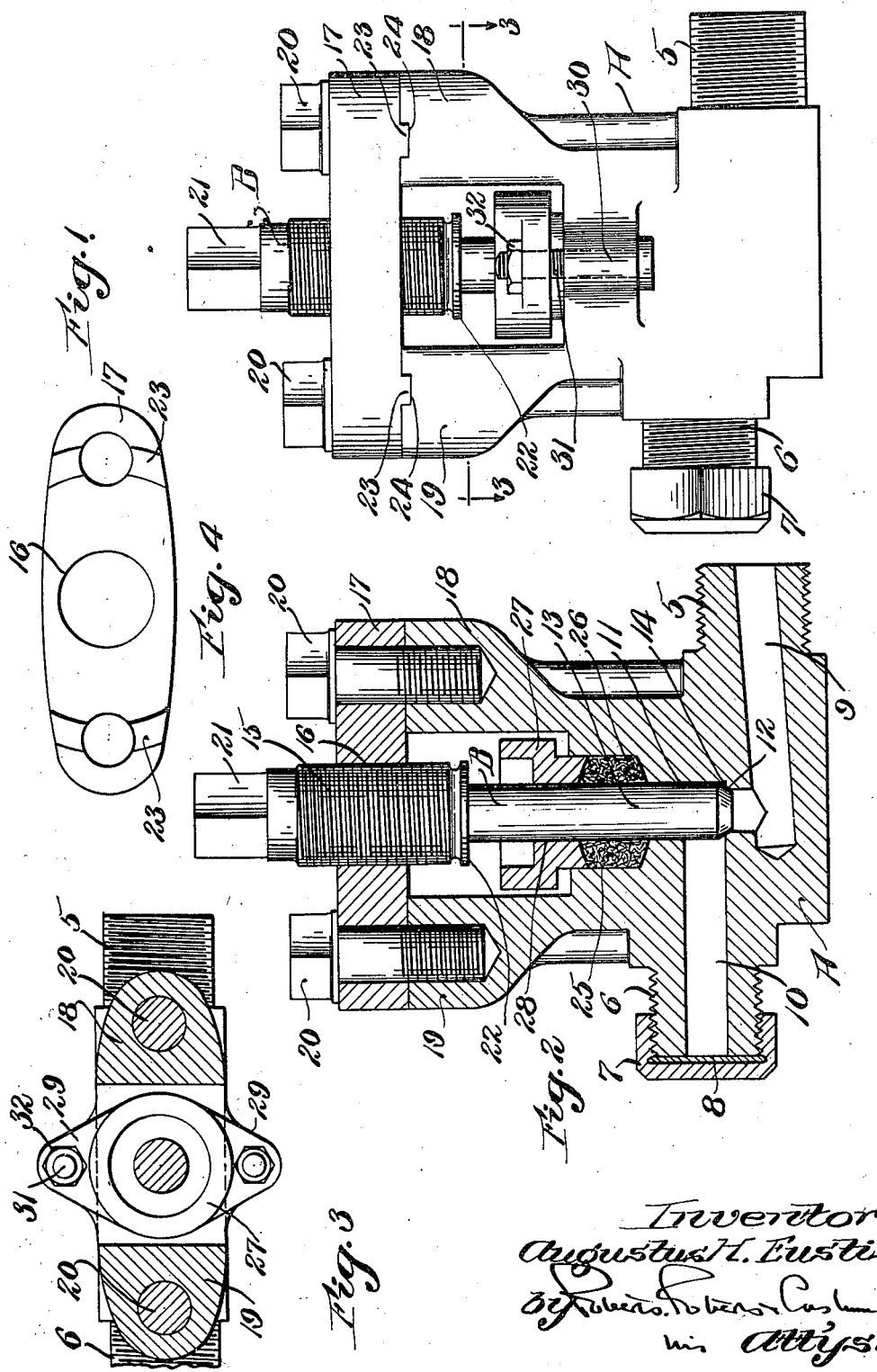

1,487,646

UNITED STATES PATENT OFFICE.

AUGUSTUS H. EUSTIS, OF MILTON, MASSACHUSETTS.

VALVE FOR HIGH FLUID PRESSURES.

Application filed January 31, 1923. Serial No. 616,095.

*To all whom it may concern:*

Be it known that I, AUGUSTUS H. EUSTIS, a citizen of the United States of America, and resident of Milton, in the county of Norfolk and State of Massachusetts, have invented new and useful Improvements in Valves for High Fluid Pressures, of which the following is a specification.

This invention relates to valves of a type adapted to close and adjustably to control a relatively small passage, and particularly adapted for use on containers for corrosive or other liquefied or gaseous materials, such as sulphur dioxide or other chemical reagents. Objects of the invention are to provide a valve of great strength which shall still be of the proper physical dimensions adapting it to use on the metal drums or other portable containers for such materials, which will serve as a primary reducing-valve capable of controlling the high pressures incident to such use, and which will provide for delicate adjustment of flow and will retain this adjustment and which will resist chemical corrosion; and in general to improve devices of the class described and to render them efficient and satisfactory in service.

The valve may comprise a casing and yoke of inert metal, providing means for external screw-control of the internal closure member, and making provision for effective packing little exposed to the fluid controlled, the whole being adapted to be housed in the narrow recesses available on the outside of the container.

In order to illustrate the invention, an example is shown in the accompanying drawings, in which;

Figure 1 is a side elevation;
Figure 2 is a vertical section;
Figure 3 is a section on the line 3—3 of Fig. 1; and
Figure 4 is a bottom plan view of the yoke 17.

The valve shown comprises an integral solid cast valve casing A, which may be formed by pressure casting to insure freedom from leakage flaws, and of any suitable inert metal such as brass. At its base the casing A is formed with integral threaded nipples 5 and 6. Nipple 5 is adapted to be screwed into the threaded opening in the drum or other container for the corrosive substance which is to be dispensed, and nipple 6 is adapted to receive any suitable delivery pipe. Nipple 6 is closed for transport by a threaded cap 7 and cap washer 8. Extending inwardly from nipples 5 and 6 bore holes 9 and 10 formed in the solid casing may be inclined at an angle to each other so that the ends of the holes are vertically spaced as indicated in Fig. 2. These bore holes have between them the controlled opening or valve seat, constituted by the walls of a bore 11 at substantially right angles to hole 10, the bore 11 being shouldered between holes 9 and 10 to form a surface of revolution at 12 accurately axial in relation to the bore 11, and adapted to serve as one wall of a restricted annular pressure reducing opening, of which the width is controlled by a suitable needle or plug valve member B. Member B has a stem 13 fitting the bore 11 with a running fit and provided with a beveled end 14 adapted to cooperate with valve seat 12. It is preferred and recommended that the materials of valve member B and seat 12 differ in hardness, to insure fit by conformity of one to the other, and freedom from sticking.

Appropriate means are provided for holding valve member B securely against seat 12 and for moving it toward and from the seat, the preferred means comprising an enlarged threaded portion 15 on member B cooperating with a threaded bore 16 in a yoke 17 spanning spaced bored and threaded lugs 18 and 19 integral with casing A and substantially diametrically opposed. Yoke 17 is retained upon lugs 18 and 19 by screws 20. The outer end of valve member B is preferably squared at 21 for an operating handle and is also provided with a flange 22 to limit withdrawal of the valve stem. The screw surfaces of portion 15 and yoke 18 are remote from the valve passages and packed joint and thoroughly ventilated by their exposure to the open air at each side.

To maintain the bore 16 in yoke 17 always in alignment with bore 11 in the casing, interfitting parts are provided on the yoke 17 and the lugs 18 and 19. These interfitting parts may comprise arcuate projections 23 on the yoke 17 fitting into complemental arcuate recesses 24 in lugs 18 and 19, these projections and recesses being concentric with the axis of member B. To prevent leakage about valve stem 13 packing 25 is provided in a gland enlargement 26 of bore 11, the packing being compressed by a sleeve 27 having an opening 28 for member B and opposite projecting bored lugs 29 above similar lugs 30 integral with the base of casing A. Bolts 31 in the bores in said lugs adjustably force sleeve 27 downward.

It will be apparent that the valve of this invention is of very heavy and homogeneous construction adapted to be cast with substantial certainty of freedom from leakage holes or flaws, and to withstand the high pressure and intense cold of its intended use; that the support of, direction of, and screw mechanism for positioning the closure member of the valve is entirely upon the exterior of the valve casing, thoroughly ventilated, and out of contact with the fluid controlled by the valve; that accurate closure, open adjustment and seating of the valve are assured by means of the interfitting parts concentric with the axis of the valve on both the valve casing and on the yoke, and that the satisfactory operation of the valve is enhanced by using inert metals of different hardness for the valve and the seat (as for example a valve of Monel metal and a seat of brass), as well as by contriving a closure between valve and seat of small area controlled by large and strong parts, adapted to be accurately adjusted and to retain their adjustment against casual displacement under rough usage.

I claim:

1. A valve for controlling high pressure corrosive substances comprising a valve casing having a passageway therethrough controlled by an interior closure member cooperating with an annular valve seat in said passageway, said seat and said closure member being of inert metals of different degrees of hardness and adapted to be compressed together at said annular internal seat.

2. A valve for controlling high pressure corrosive substances comprising a casing and an interior closure member for controlling the passage through said casing, said parts being of inert non-corrodible metals of different degrees of hardness, one of said parts being of Monel metal.

3. A valve for controlling high pressure corrosive substances having therein passageways comprising bores in a solid piece of inert metal, and an unitary internal closure element of a different inert metal, in combination with an exterior mechanical connection for controlling the position of said closure element.

4. A valve for controlling high pressure substances comprising a casing having a passageway therethrough, a closure member movable in a bore in said casing to control the flow of the substances through said passageway, spaced lugs projecting from said casing axially of said bore, a yoke spanning said lugs and having a threaded opening therein in alignment with said bore and of greater diameter than said bore to receive a threaded enlargement on said member, and interfitting parts in the form of arcuate projections and complemental recesses on said yoke and lugs to maintain the axial registration of said opening and bore.

5. A valve device for controlling fluids under high pressure comprising a casing having a passageway therethrough, a closure member reciprocable in a bore in said casing to control the flow of the substances through said passageway, spaced lugs projecting from said casing in parallelism with the axis of said bore, a yoke spanning said lugs and having a threaded opening therein in alignment with said bore and of greater diameter than said bore to receive a threaded enlargement on said member, and interfitting parts in the form of projections and complemental recesses on said yoke and lugs, said parts being concentric with the axis of said bore to maintain the opening in said yoke in axial registration with said bore, and means for preventing leakage about said member through said bore.

6. A valve comprising a valve casing, a closure member movable in a bore in said casing to control the flow of fluid through the valve, a yoke spanning portions of said casing and having a threaded opening adapted to register with said bore, a threaded enlargement on said member cooperating with said opening and interfitting parts on said yoke and on the portions of the casing spanned thereby to maintain said opening in registration with said bore, and means for preventing leakage through said bore about said member including a packing sleeve and means upon the exterior of said casing for retaining said sleeve in operative position.

Signed by me at Boston, Mass., this twenty-seventh day of January, 1923.

AUGUSTUS H. EUSTIS.